United States Patent
Carson

(10) Patent No.: US 7,684,307 B2
(45) Date of Patent: Mar. 23, 2010

(54) IDENTIFIER TAG TO TRACK LAYERS IN A MULTI-LAYER OPTICAL DISC

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 1372 days.

(21) Appl. No.: 10/779,437

(22) Filed: Feb. 13, 2004

(65) Prior Publication Data

US 2004/0174803 A1    Sep. 9, 2004

Related U.S. Application Data

(60) Provisional application No. 60/447,620, filed on Feb. 13, 2003.

(51) Int. Cl.
G11B 7/24 (2006.01)

(52) U.S. Cl. .................................. 369/275.1; 369/275.4

(58) Field of Classification Search ................. 369/94, 369/275.1, 275.3, 275.4, 281, 283, 286; 430/270.13, 430/320, 321; 428/64.1
See application file for complete search history.

(56) References Cited

U.S. PATENT DOCUMENTS

| | | | |
|---|---|---|---|
| 5,303,225 A | 4/1994 | Satoh et al. | |
| 5,500,850 A | 3/1996 | Van et al. | |
| 5,503,963 A | 4/1996 | Bifano | |
| 5,608,715 A | 3/1997 | Yokogawa et al. | |
| 5,745,473 A | 4/1998 | Best et al. | |
| 6,141,299 A | 10/2000 | Utsumi | |
| 6,370,091 B1 | 4/2002 | Kuroda | |
| 6,421,315 B1 | 7/2002 | Satoh et al. | |
| 6,424,614 B1* | 7/2002 | Kawamura et al. | 369/275.3 |
| 6,667,951 B1 | 12/2003 | Kim | |
| 6,731,578 B1* | 5/2004 | Sako et al. | 369/53.23 |
| 6,998,163 B2* | 2/2006 | Murata et al. | 428/64.1 |
| 7,193,948 B2 | 3/2007 | Furukawa et al. | |
| 2001/0003384 A1* | 6/2001 | Morita | 264/219 |
| 2002/0054562 A1 | 5/2002 | Satoh et al. | |
| 2002/0163867 A1* | 11/2002 | Kobayashi et al. | 369/53.21 |
| 2002/0191499 A1* | 12/2002 | Ando et al. | 369/30.03 |

(Continued)

FOREIGN PATENT DOCUMENTS

EP    0694915 A1    1/1996

(Continued)

Primary Examiner—Joseph H Feild
Assistant Examiner—Henok G Heyi
(74) Attorney, Agent, or Firm—Fellers, Snider, et al.

(57) ABSTRACT

Method and apparatus for tracking layers in a multi-layer optical disc. The disc includes a first layer which stores a first set of user data and a table of contents (TOC) for the disc. A second layer stores a second set of user data and an identifier tag which identifies the second layer as corresponding to the first layer. The identifier tag can comprise a portion of, or a complete copy of the TOC, or can comprise a reference value which, among other things, identifies a revision level of the second layer. Preferably, the first layer is also provided with a reference value. In this way, a database or other mechanism can be used to track the history of the various layers of the disc. Stampers form the respective layers and the ID tags further serve to ensure correspondence thereof in the formation of the disc.

25 Claims, 4 Drawing Sheets

U.S. PATENT DOCUMENTS

| | | | |
|---|---|---|---|
| 2003/0223344 A1* | 12/2003 | Lee et al. | 369/109.01 |
| 2004/0001414 A1* | 1/2004 | Kadowaki et al. | 369/59.24 |
| 2004/0179462 A1* | 9/2004 | Freedman et al. | 369/275.4 |
| 2004/0264339 A1* | 12/2004 | Miyagawa et al. | 369/94 |
| 2006/0256691 A1* | 11/2006 | Miura et al. | 369/59.19 |
| 2006/0256702 A1* | 11/2006 | Kurokawa | 369/275.1 |

FOREIGN PATENT DOCUMENTS

| | | |
|---|---|---|
| EP | 0899723 A2 | 3/1999 |
| JP | 03-219440 | 9/1991 |
| JP | 06-349116 | 12/1994 |
| JP | 08-096406 | 4/1996 |

* cited by examiner

IDENTIFIER TAG TO TRACK LAYERS IN A MULTI-LAYER OPTICAL DISC

RELATED APPLICATIONS

The present application makes a claim of domestic priority to U.S. Provisional Patent Application No. 60/447,620 filed Feb. 13, 2003.

FIELD OF THE INVENTION

The present invention relates generally to the field of optical disc technology and more particularly, but without limitation, to the identification of multiple layers within a multi-layer optical disc.

BACKGROUND

Optical discs are media used to store a wide variety of digitally encoded data. Such discs are usually portable in nature and can be played in a variety of settings (personal computers, car audio players, home theater systems, handheld personal entertainment devices, home gaming systems, etc.).

A typical optical disc comprises a circular disc having one or more recording layers of light reflective material embedded in a refractive substrate. Each recording layer is disposed along a plane substantially normal to an axis about which the disc is rotated and stores data in the form of localized pits and lands along a continuously extending spiral track. A data transducing head uses a laser or similar light source to output a readback signal based on the different reflectivities of the pit and land areas. Decoding circuitry decodes the user data for output by the appropriate playback device.

An optical disc typically has a lead-in area, a program area and then a lead-out area. Table of contents or similar information are typically stored in the lead-in area to allow the readback system to identify the contents of the playback area. Multi-layer discs, popular for certain types of formats such as DVD-9, use multiple embedded, semi-translucent layers that can be accessed by switching the focal length of the readback system.

In a multi-layer disc, the readback system typically moves the transducing head radially across the disc (such as from inner diameter, ID to outer diameter, OD). When the first layer is completed, the readback system switches the focal length of the head and continues reading the next layer in the disc back across the radius of the disc (such as from OD to ID). The first layer has a lead-in area that stores a table of contents identifying the program area contents of all of the layers in the disc. The end of the final layer has a lead out area to indicate playback is complete.

Since the content information for an entire multi-layer disc is presently only stored on the first layer (in the lead-in area), there is generally no effective way to verify the contents of a second layer absent the first layer. This makes individual testing of layers difficult, and also makes it harder to ensure that the correct layers are assembled into the final replicated disc.

SUMMARY OF THE INVENTION

In accordance with preferred embodiments, the present invention is generally directed to tracking layers in a multi-layer optical disc.

In one aspect, a stamper is configured to form pits and lands in a non-first layer in a multi-layer optical disc. The pits and lands define data including an identifier tag. The identifier tag identifies the stamper as corresponding to a second stamper configured to form pits and lands in a first layer of the disc.

Preferably, the pits and lands in the first layer of the disc define data including a table of contents (TOC) for the disc, and the identifier tag comprises at least a portion of the TOC. Alternatively, the identifier tag can comprise a complete copy of the TOC.

In accordance with other preferred embodiments, the identifier tag comprises a reference value that is associated with the contents of the disc. Among other characteristics, the reference value facilitates identification of a revision level of the stamper using, for example, a network accessible database.

In another aspect, a replicated article is provided as formed by the stamper, and a multi-layer optical disc is provided as formed from the replicated article.

In another aspect, a multi-layer optical disc is provided that comprises a first layer which stores a first set of user data and a table of contents (TOC) for the disc. The disc further comprises a second layer aligned adjacent the first layer and which stores a second set of user data and an identifier tag, the identifier tag identifying the second layer as corresponding to the first layer.

In some preferred embodiments, as before the identifier tag comprises at least a portion of, or a complete copy of, the TOC. In other preferred embodiments, the identifier tag is a reference value associated with the contents of the disc and can be used to identify a revision level of the second layer.

In additional preferred embodiments, the first layer also stores a second reference value associated with the contents of the disc, with the reference value of the first layer being the same as, or different from, the reference value of the second layer. When additional layers are included in the disc, a third layer also includes an identifier tag which identifies the third layer as corresponding to the first and second layers.

In yet another aspect, a method includes a step of forming a first layer for a multi-layer optical disc which stores a first set of user data and a table of contents (TOC) for the disc. The method further includes a step of forming a second layer for the disc configured to be aligned adjacent the first layer and which stores a second set of user data and an identifier tag which identifies the second layer as corresponding to the first layer.

The method further preferably comprises a step of attaching the second layer to the first layer. The method further preferably comprises forming a third layer for the disc configured to be aligned adjacent the second layer and which stores a third set of user data and a second identifier tag which identifies the third layer as corresponding to the first and second layers.

The method further preferably comprises using the identifier tag to test the second layer apart from the first layer. The method further preferably comprises using the identifier tag to identify a revision level of the second set of user data.

In this way, a global history of the individual layers can readily be maintained, and errors with regard to the improper joining of layers from different titles, and/or the use of layers of incorrect revision level, can be detected and eliminated.

These and various other features and advantages which characterize the claimed invention will become apparent upon reading the following detailed description and upon reviewing the associated drawings.

DETAILED DESCRIPTION

Figure 1:
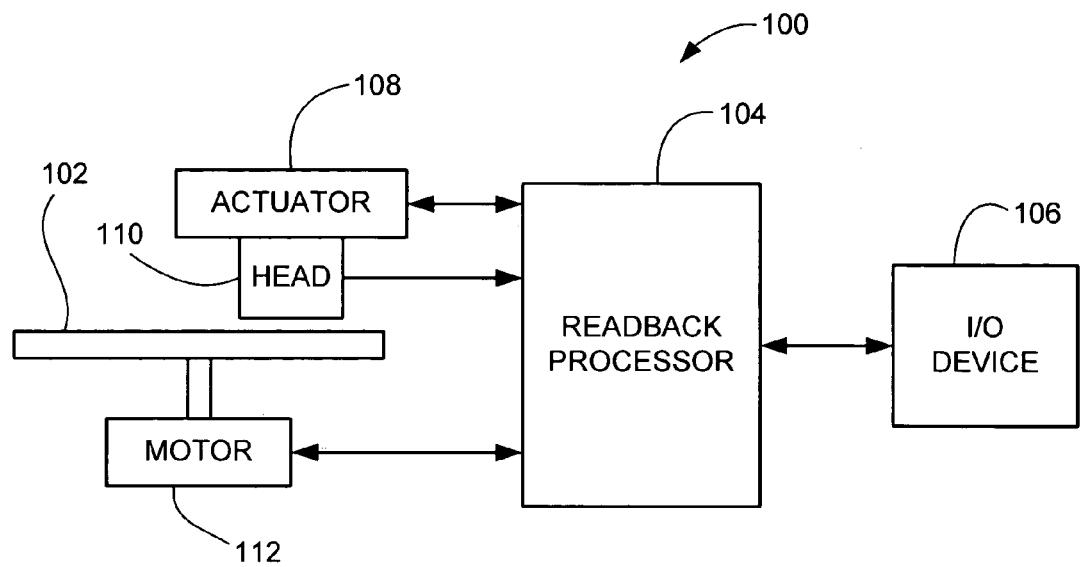
FIG. 1 is a functional block diagram of an optical disc readback system.

FIG. 1 shows a readback system 100 used to read back data from an optical disc 102. For purposes of the present discussion, the disc 102 is contemplated as having a multi-layer, digital versatile disc (DVD) compatible format such as DVD-9, although the claimed invention is not so limited.

The readback system 100 includes a readback processor 104 which communicates with an input/output (I/O) device 106. Depending upon the type of data stored on the disc 102 (i.e., DVD-ROM, DVD audio, DVD video, etc.), the device 106 can comprise a personal computer, an optical disc audio or video player, a gaming system, etc.

The readback processor 104 controls an actuator 108, optical pickup (transducing head) 110 and disc motor 112. During a readback operation the readback processor 104 processes a modulated signal transduced by the head 110 to provide originally stored data from the disc 102 to the device 106.

Figure 2:
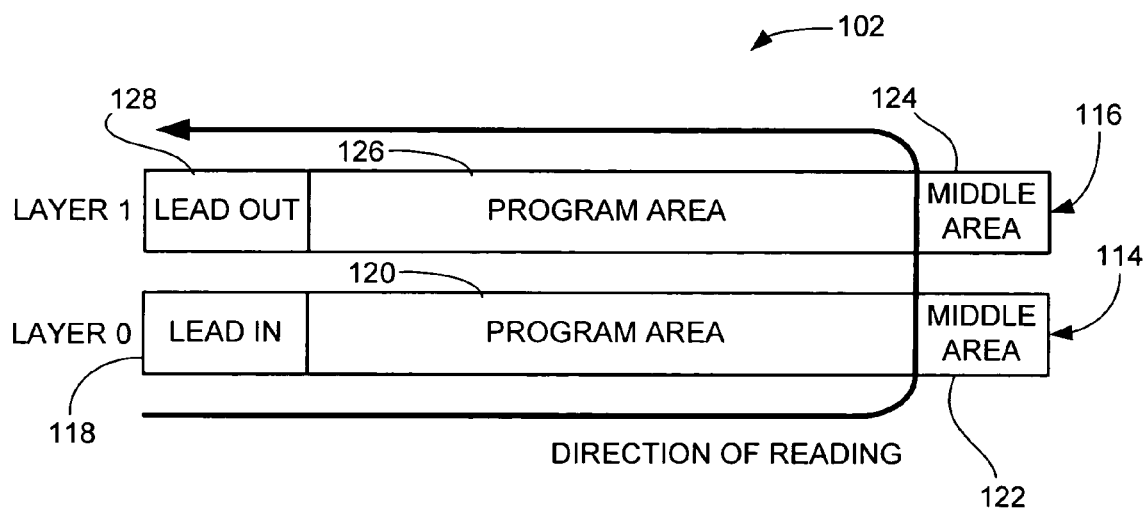
FIG. 2 provides a generalized representation of a multi-layer optical disc readable by the system of FIG. 1 and configured in accordance with preferred embodiments of the present invention.

FIG. 2 provides a generalized representation of a data structure of the disc 102. The disc 102 includes two adjacent data recording layers 114, 116, denoted as "layer 0" and "layer 1" respectively. Other numbers and configurations of layers can alternatively be used as desired.

The first layer 114 (layer 0) has a lead-in area 118 followed by a program area 120 and a middle area 122. The second layer 116 (layer 1) has a middle area 124, a program area 126 and a lead-out area 128. As will be recognized, the respective sizes of the various areas shown in FIG. 2 in terms of data storage capacity are not represented to scale; rather, the data capacities of the program areas are very large as compared to the lead-in, lead-out and middle areas.

Content information for the disc 102 is stored in the lead-in area 118 in the form of a table of contents, TOC. As will be recognized, the TOC identifies the collective contents of the program areas 120, 126 in a standardized manner in terms of title, length, elapsed times, number and locations of chapter divisions, etc.

During a sequential readback operation, the respective layers 114, 116 are read in the direction shown. The head 110 (FIG. 1) will locate the lead-in area 118, access the TOC and initiate recovery of the contents of the program area 120 on layer 0. At the end of the program area 120, the head 110 will adjust focal depth to the appropriate level to read layer 1, and continue with the recovery of the contents of the program area 126 until the lead-out area 128 is reached, signifying the end of the disc 102. The middle areas 122, 124 serve as buffer areas and are typically skipped.

Figure 3:
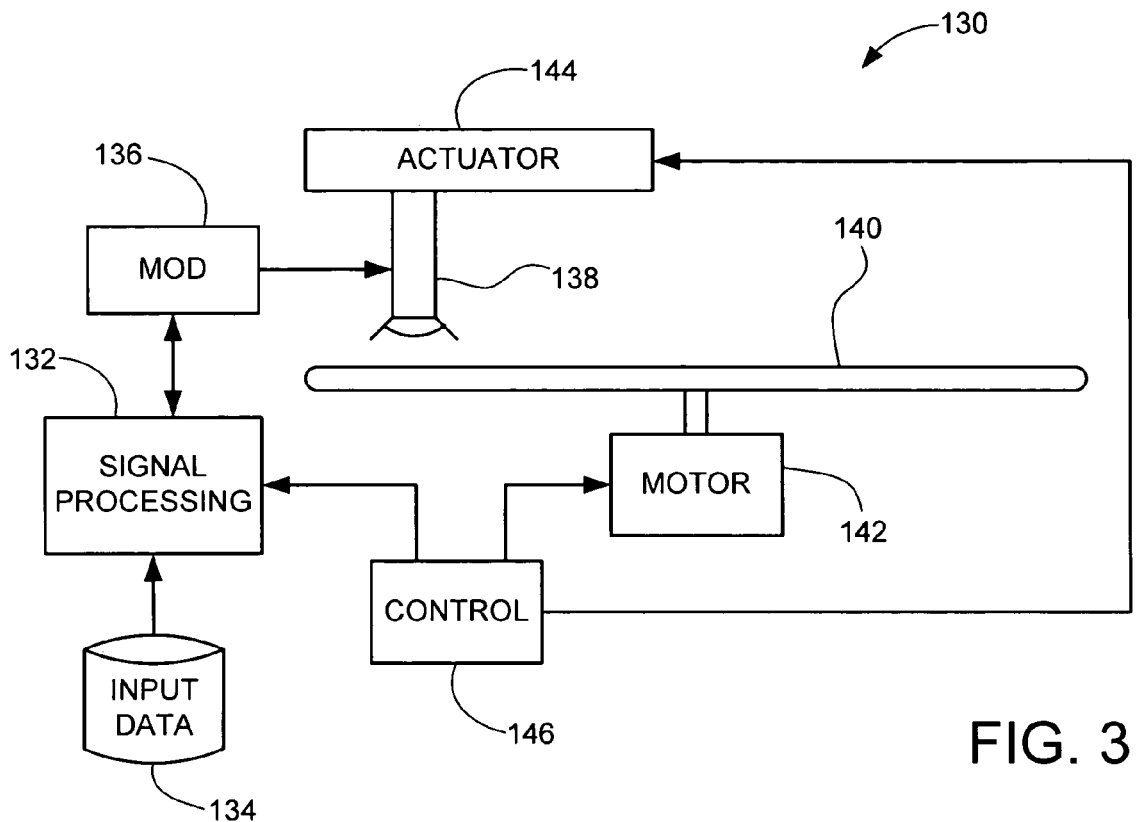
FIG. 3 illustrates a recording system used to form master layer discs for the disc of FIG. 2.

The respective layers 114, 116 are preferably formed using a recording system such as represented at 130 in FIG. 3. The recording system 130, preferably characterized as a laser beam recorder (LBR), includes a signal processing block 132 which processes input data from a source 134. The signal processing block 132 provides encoded data to a modulation (MOD) circuit 136, which in turn outputs a frequency modulated signal to a light emitting transducer 138.

The transducer 138 selectively exposes a thin layer of spun photoresist on a glass master disc 140. The disc 140 is controllably rotated by a motor 142 and the transducer 138 is advanced radially across the disc 140 by an actuator 144, both under the control of a control block 146. In this way, a selected pattern of exposed and non-exposed photoresist is generated in relation to the input data from the source 134.

Subsequent processing steps are carried out on the glass master disc 140 to create stampers used to form replicated discs. At this point it will be noted that a glass master disc 140 is formed for each of the layers 114, 116 of the disc 102 in turn.

As previously mentioned, the manufacture of multi-layer optical discs in a high volume manufacturing environment poses a number of challenges. Conventionally, non-zero layers are not provided with information that readily identifies such layers as belonging with other non-zero and zero layers for a given disc title. Because the program contents on non-zero layers (such as in the program area 126) have a starting point that is somewhere in the "middle" of the overall disc contents, it is generally not possible to accurately test a particular non-zero layer and verify that the contents are correct without knowing the TOC information from the associated zero layer, as such information is generally required to ascertain where the non-zero layer data should start and where it should end.

Another problem that has arisen relates to detecting layer mismatches during manufacturing; that is, situations where the zero layer from a first disc title is improperly joined with a non-zero layer from a second disc title. While it may be possible to compare the length of the non-zero layer program area contents to the TOC in the zero layer in order to detect such a mismatch, this approach will only generally tend to work if the non-zero layer program area contents are in fact significantly longer or shorter that what is expected by the TOC.

Thus, non-zero layers with the same amount of data from different titles could be readily attached to a given zero layer, and reference to the length information in the TOC would not enable detection of this error.

Yet another problem relates to the fact that updated versions of individual layers may be formed from time to time during the course of the production life of a given disc title. Such updated versions may be generated to provide altered program area contents for a given layer (e.g., the addition of additional features, the correction of noted errors, etc.). Such updated versions may also relate to a remastering of a particular layer to form a new generation of stampers, etc. At present, there is generally no effective way to track whether a given set of layers belongs together, and to readily identify the status (including revision level) of the various individual layers in a given disc.

Accordingly, preferred embodiments of the present invention are generally directed to the incorporation of identifier tags into the various layers of a multi-layer disc. The manner in which this approach advantageously solves these and various other problems of the prior art will now be discussed.

Figure 4:
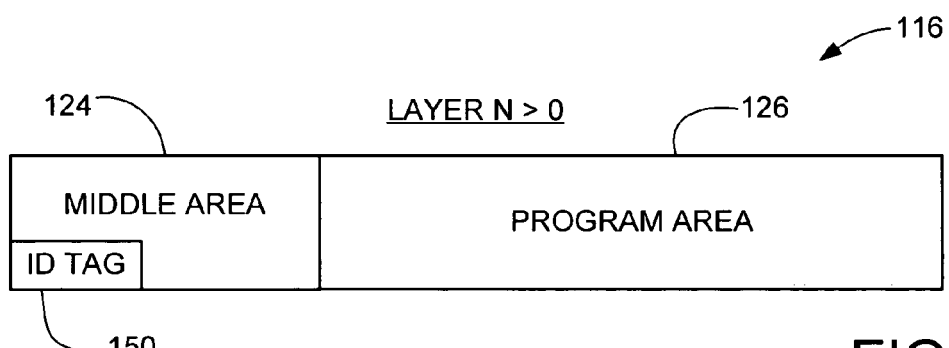
FIG. 4 is a schematic representation of a format for a non-zero layer (layer 1) of the optical disc of FIG. 2.

FIG. 4 provides a generalized representation of relevant portions of the second layer 116 (layer 1) of FIG. 2. The layer is more generally referred to as layer N>0 in FIG. 4, since the format shown can apply to any non-zero layer (i.e., a third layer, a fourth layer, etc.) and is not just limited to the second layer in a disc.

Preferably, the middle area 124 in FIG. 4 is provided with a field 150 which stores an identifier tag assigned to the layer. The identifier (ID) tag is expressed within the layer as a sequence of pits and lands that, when decoded, provides a multi-bit representation of information that relates to the contents of the layer 116.

The ID tag indicates that the layer 1 corresponds to (i.e., belongs with) layer 0. While the ID tag field 150 is conveniently located in and is accessible from the middle area 124, other locations can readily be used including the program area 126 or the lead-out area 128 (FIG. 2). It is important to note that the ID tag does not merely constitute the program area contents per se, but rather serves as a separate identifier thereof.

In one preferred approach, the ID tag comprises at least a portion of the TOC from the first layer 114, such as relating to that portion of the title contents resident in the program area 126 on the layer 116. In this way, this information can be used during stand-alone testing of the layer 116 without the need to access the TOC from the associated layer 114. Alternatively, a copy of the complete TOC from the first layer 114 can be easily stored in the ID tag field 150.

In another approach, the ID tag additionally, or alternatively, includes a particular reference value that is assigned to the layer 116. Generally, the reference value is a unique identifier (such as an encoded or nonencoded alphanumeric string) that, through access to a database, enables identification of the title, contents, revision level, mastering date, and other relevant history characteristics of the layer 116.

Figure 5:
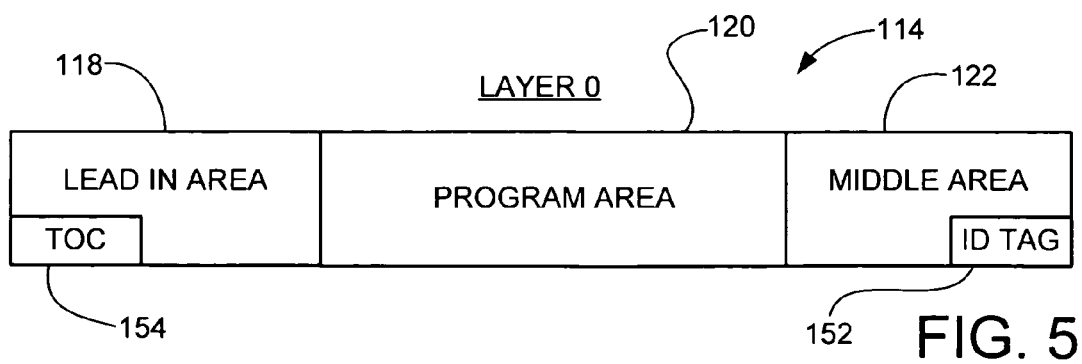
FIG. 5 is a schematic representation of a format for a zero layer (layer 0) of the optical disc of FIG. 2.

Preferably, all of the layers of the disc 102 are provided with ID tags, including the first layer 114 (layer 0). FIG. 5 shows the first layer 114 in this embodiment to include an ID tag field 152 in the middle area 122. As before, the ID tag field 152 can alternatively be placed elsewhere within the first layer 114, such as in the lead-in area 118 or the program area 120. It is noted that the ID tag field 152 is provided in addition to the aforementioned TOC in a TOC field 154 in the lead-in area 118.

The ID tag in field 152 on layer 0 can be the same as, or different from, the ID tag in field 150 on layer 1. In this way, accessing the ID tags can readily allow a determination that the particular layers 114, 116 belong together.

Figure 6:
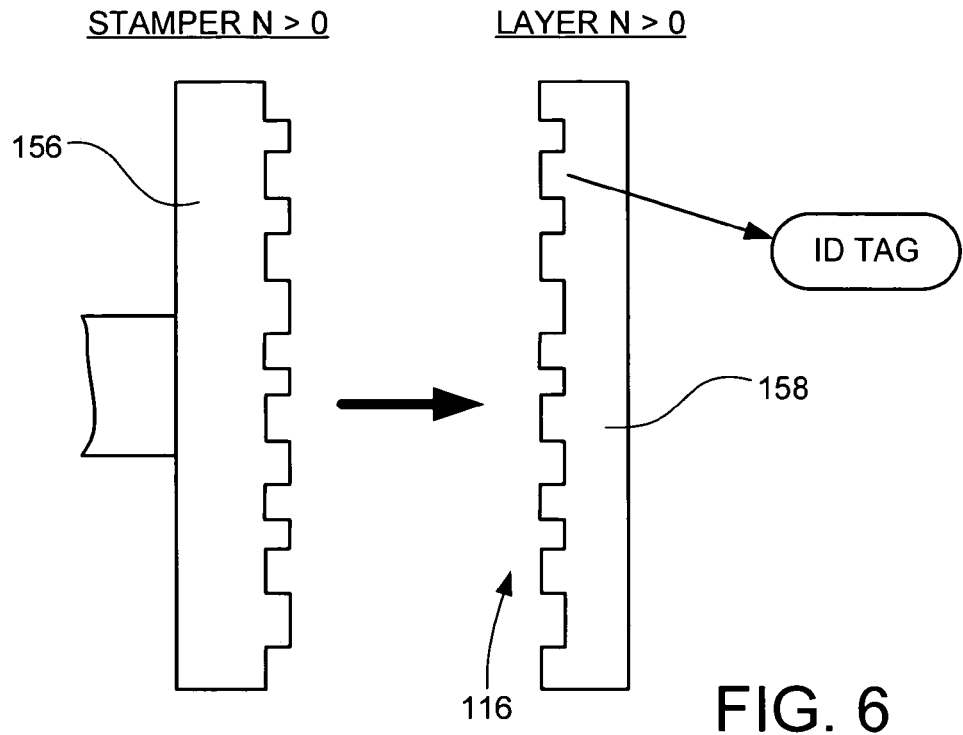
FIG. 6 represents a stamper formed using the system of FIG. 3 to form the layer of FIG. 4.

The ID tags in the fields 150, 152 are formed in a straight-forward manner, as will now be discussed. FIG. 6 provides a simplified representation of a first stamper 156 for layer 1. The first stamper 156, more generally referred to in FIG. 6 as stamper N>0 to represent a non-zero layer stamper, is formed using the system 130 of FIG. 3.

More particularly, with reference again to FIG. 3, input data from source 134 relating to the data to be stored on layer 1, including the ID tag, are utilized to cut a glass master 140. Appropriate metallization and stamper growing processes are thereafter carried out in a substantially conventional manner to provide the first stamper 156.

The first stamper 156 thus includes a sequence of pits and lands that embody the ID tag. The ID tag, as well as remaining data stored on the stamper, can readily be read using suitable stamper reading equipment. The pit and land pattern on the stamper is transferred to a layer 1 substrate 158, as shown in FIG. 6, during manufacturing using a suitable injection molding or similar pressing process. As a result, the layer 1 substrate 158 (which includes the layer 1 data along a boundary thereof), also includes the ID tag as expressed as a sequence of pits and lands as shown.

Figure 7:
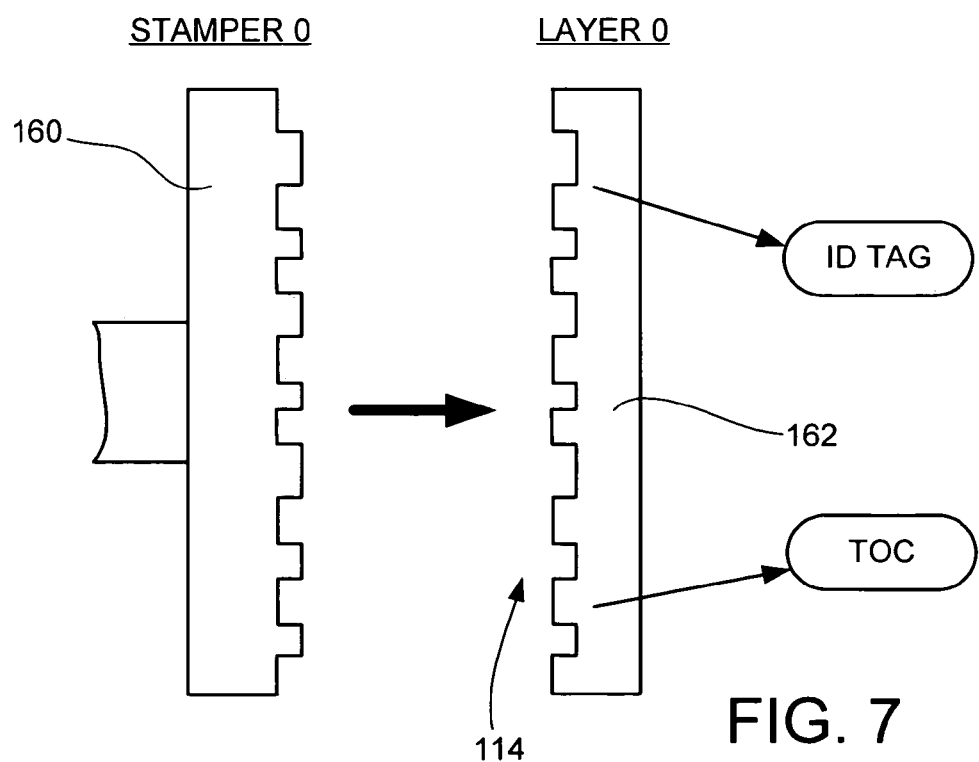
FIG. 7 represents a stamper formed using the system of FIG. 3 to form the layer of FIG. 5.

Similarly, FIG. 7 shows a second stamper 160, also referred to as stamper 0, which is likewise formed using the system 130 of FIG. 3. As before, the second stamper 160 preferably includes a readable pit and land sequence that includes the TOC and the ID tag for layer 0, which are also transferred to a layer 0 substrate 162 during manufacturing. The layer 0 substrate 162 includes the layer 0 data along a boundary thereof, as shown.

At this point it will be noted that the ID tag from the pits and lands on the first stamper 156 advantageously enables the first stamper 156 to be identified as corresponding to the second stamper 158, which can be very useful during manufacturing processing. For example, prior to a pressing operation wherein multiple substrates are run, a quick verification of the ID tag on the first stamper 156 (or the second stamper 158) can confirm that the correct stamper is being used to provide the desired title, contents, revision level, etc. for the associated layers about to be formed.

Likewise, the provision of the ID tags on the substrates 158, 162 facilitate the testing and verification of these substrates individually (separately) prior to assembly into the disc 102. Advantageously, the ID tags are also accessible after the substrates have been incorporated into the disc 102, as depicted by FIG. 8.

Figure 8:
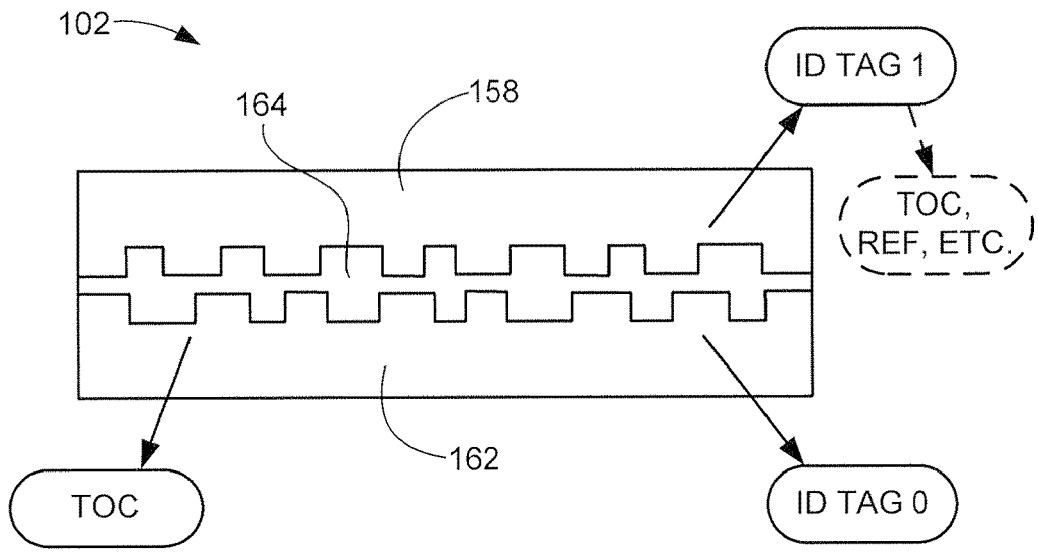
FIG. 8 is a generalized representation of the assembled disc of FIG. 2.

FIG. 8 provides a simplified, exaggerated representation of the disc 102 as formed by the joining together of the substrates 158, 162 of FIGS. 6 and 7 using an intermediary layer of epoxy 164. FIG. 8 is useful in illustrating how that, during further processing of the completed disc 102, the TOC, the ID tag for layer 0 (represented in FIG. 8 as ID tag 0), and the ID tag for layer 1 (ID tag 1) can be accessed by a reader system such as the system 100 in FIG. 1. These various values can be immediately verified as constituting an appropriate set for the given disc title, thereby ensuring the disc has been properly assembled without the need to access the program area contents.

Figure 9:
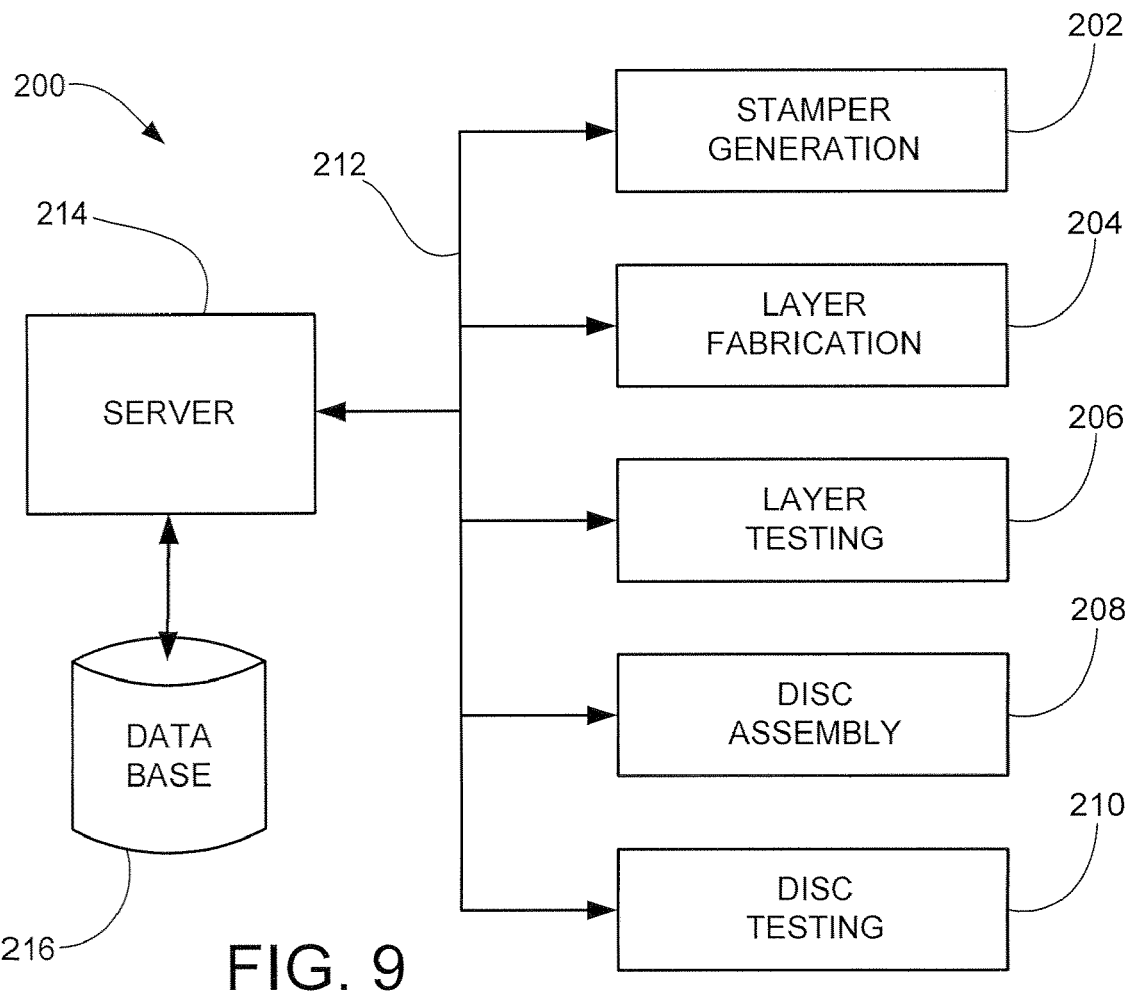
FIG. 9 is a functional block representation of a manufacturing and testing environment used to form the assembled disc of FIG. 8.

FIG. 9 provides a functional block representation of a manufacturing and testing environment 200 used to form a population of discs such as nominally identical to the assembled disc 102 of FIG. 8. A generalized process flow is represented by a number of operational stations.

These operational stations include a stamper generation block 202 in which stampers (such as 156, 160) are formed for a given title, a layer fabrication block 204 in which substrates, or articles (such as 158, 162) for the individual layers are fabricated from the stampers using a pressing operation, and a layer testing block 206 which individually tests the substrates for manufacturing defects.

The substrates are assembled into completed discs at a disc assembly block 208, and the assembled discs are tested at a disc testing block 210. It will be recognized that the various blocks 202-210 in FIG. 9 may be carried out in a single facility, or may be spread out among a number of different facilities, locations and/or entities.

Regardless, it is contemplated that each of the various blocks 202-210 communicate over a computer network (represented by communication path 212) with a server 214 that maintains a database 216. The database 216 preferably functions as described above to assign and track the ID tags for the various individual layers. Preferably, the database maintains data history records for each layer, so that each of the stations 202-210 can both provide data from the database 216 when a particular ID tag is accessed, as well as can update the database 216 at the conclusion of a particular operation to update the history of the layer.

It will now be appreciated that the presently preferred embodiments discussed herein provide advantages over the prior art. The ID tags presented herein can be readily incorporated into any number of different disc formats in a straightforward and inexpensive manner.

The ID tags provide global history capabilities in that the ID tags are preferably accessible at the stamper level, the individual layer (substrate) level, and at the completed disc level, allowing a full history associated with a given disc title to be easily determined, even years after the manufacture of the disc.

The ID tags provide significantly improved manufacturing processing in that the correspondence of particular layers within a given title set can be immediately and easily established. The layers can also be independently and separately tested and processed in an efficient manner.

In view of the foregoing, the present invention (as embodied herein and as claimed below) is generally directed to tracking layers in a multi-layer optical disc.

In one aspect, a stamper (such as 156) is configured to form pits and lands in a non-first layer (such as 116) in a multi-layer optical disc (such as 102). The pits and lands define data including an identifier tag (such as stored in field 150) which identifies the stamper as corresponding to a second stamper (such as 160) configured to form pits and lands in a first layer (such as 114) of the disc.

Preferably, the pits and lands in the first layer of the disc define data including a table of contents (TOC) for said disc (such as stored in field 154), and wherein the identifier tag comprises at least a portion of the TOC. Alternatively, the identifier tag can comprise a complete copy of the TOC.

In accordance with other preferred embodiments, the identifier tag comprises a reference value that is associated with the contents of the disc, and which facilitates identification of a revision level of the stamper.

In another aspect, a replicated article (such as 158) is provided as formed by the stamper, and a multi-layer optical disc (such as 102) is formed from the replicated article.

In another aspect, a multi-layer optical disc is provided that comprises a first layer (such as 114) which stores a first set of user data (such as at 120) and a table of contents (TOC) for the disc (such as at 154). The disc further comprises a second layer (such as 116) aligned adjacent the first layer which stores a second set of user data (such as at 126) and an identifier tag (such as at 150) which identifies the second layer as corresponding to the first layer.

In some preferred embodiments, the identifier tag comprises at least a portion of, or a complete copy of, the TOC. In other preferred embodiments, the identifier tag is a reference value associated with the contents of the disc and which can be used to identify a revision level of the second layer.

In additional preferred embodiments, the first layer also stores a second reference value associated with the contents of the disc, with the reference value of the first layer being the same as, or different from, the reference value of the second layer. When additional layers are included in the disc, a third layer (such as layer N>0 in FIG. 3) also includes an identifier tag which identifies the third layer as corresponding to the first and second layers.

In yet another aspect, a method includes a step of forming a first layer (such as 114) for a multi-layer optical disc (such as 102) which stores a first set of user data (such as at 120) and a table of contents (TOC) for the disc (such as at 154). The method further includes a step of forming a second layer (such as 116) for the disc configured to be aligned adjacent the first layer and which stores a second set of user data (such as at 126) and an identifier tag (such as at 150) which identifies the second layer as corresponding to the first layer.

The method further preferably comprises a step of attaching the second layer to the first layer (as depicted in FIG. 8). The method further preferably comprises forming a third layer for the disc configured to be aligned adjacent the second layer and which stores a third set of user data and a second identifier tag which identifies the third layer as corresponding to the first and second layers.

The method further preferably comprises using the identifier tag to test the second layer apart from the first layer (such as at block 206). The method further preferably comprises using the identifier tag to identify a revision level of the second set of user data (such as at steps 202-210).

For purposes of the appended claims, the term "corresponding to" will be defined consistent with the foregoing discussion to describe the correct association of the contents of the recited layer/stamper with the contents of the other recited layer/stamper, and not merely identifying, for example, a focal depth or other characteristic of the respective stamper/layer.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method, comprising:
forming a first layer for a multi-layer optical disc, the first layer comprising a first substrate with a sequence of pits and lands which define a first set of user data and a table of contents (TOC) for the disc;
forming a second layer for the disc configured to be aligned adjacent the first layer, the second layer comprising a second substrate with a sequence of pits and lands which define a second set of user data and an identifier tag;
recovering the identifier tag from the second layer using a readback system which reads the second substrate;
using the recovered identifier tag to access a database stored in computer memory to retrieve information from the database associated with the second layer; and
using the retrieved information to verify the second layer corresponds to the first layer.

2. The method of claim 1, further comprising a subsequent step of attaching the second layer to the first layer.

3. The method of claim 1, further comprising forming a third layer for the disc configured to be aligned adjacent the second layer, the third layer comprising a third substrate with a sequence of pits and lands which define a third set of user data and a second identifier tag which, via said database, identifies the third layer as corresponding to the first and second layers.

4. The method of claim 1, further comprising using the readback system of the recovering step to test the second layer for defects prior to attachment of the second layer to the first layer.

5. The method of claim 1, further comprising using the retrieved information to identify a revision level of the second set of user data.

6. The method of claim 1, wherein the identifier tag on the second layer is characterized as a second identifier tag, wherein the pits and lands of the first layer further define a first identifier tag different from the second identifier tag, and wherein the method further comprises using the computer system to uniquely assign the first and second identifier tags to the respective first and second layers.

7. The method of claim 1, wherein the second layer comprises a middle area, a program area and a lead out area, and wherein both the second set of user data and the identifier tag are located within said program area.

8. The method of claim 1, wherein the second layer does not store a TOC for the disc.

9. The method of claim 1, wherein the identifier tag of the second layer is characterized as a second identifier tag, wherein the retrieved information associated with the second layer is characterized as second information, wherein the pits and lands of the first layer further define a first identifier tag, and wherein the method further comprises:
 recovering the first identifier tag from the first layer using a readback system which optically detects said sequence of pits and lands; and
 using the recovered first identifier tag to access said database to retrieve first information from the database associated with the first layer, wherein both the first and second information are used to verify the second layer corresponds to the first layer prior to attachment of the second layer to the first layer to form said disc.

10. The method of claim 1, wherein the retrieved information comprises a title for the disc.

11. The method of claim 1, wherein the retrieved information comprises a history of steps taken during manufacture of the second layer.

12. An apparatus comprising:
 a first stamper with pits and lands configured to form a corresponding sequence of pits and lands in a first layer of a multi-layer optical disc; and
 a second stamper with pits and lands configured to form a corresponding sequence of pits and lands in a second layer of the disc, the second layer comprising an identifier tag which identifies the second stamper as corresponding to the first stamper, the identifier tag comprising a reference value associated with the contents of the disc;
 a computer system which stores a database in memory; and
 a readback system coupled to the computer system and configured to read the pits and lands in the second stamper to recover the identifier tag, to use the recovered identifier tag to access the database and retrieve information therefrom associated with the second stamper, and to use the retrieved information to verify the second stamper corresponds to the first stamper.

13. The apparatus of claim 12, wherein the pits and lands in the first layer of the disc define data including a table of contents (TOC) for said disc, and wherein the identifier tag further comprises at least a portion of the TOC.

14. An injection molded article formed by the second stamper of claim 12.

15. A multi-layer optical disc formed from the injection molded article of claim 14.

16. The apparatus of claim 12, wherein the readback system is further configured to test the stamper for defects prior to use of the stamper to form the second layer.

17. The apparatus of claim 12, wherein the retrieved information identifies a revision level of the stamper.

18. The apparatus of claim 12, wherein the retrieved information identifies a title for the disc.

19. The apparatus of claim 12, wherein the retrieved information comprises a history of steps carried out using the second stamper.

20. The apparatus of claim 12, wherein the readback system is further configured to communicate with the computer system upon said verification to update the database.

21. A multi-layer optical disc, comprising:
 a first layer which stores a first set of user data and a table of contents (TOC) for the disc; and
 a second layer aligned adjacent the first layer which stores a second set of user data and a second identifier tag which identifies the second layer as corresponding to the first layer, wherein a copy of the second identifier tag does not appear on the first layer.

22. The multi-layer optical disc of claim 21, wherein the first layer comprises a lead in area, a middle area and a program area therebetween, wherein the first set of user data is located in the program area, and wherein the TOC is located in the lead in area.

23. The multi-layer optical disc of claim 22, wherein first layer further stores a first identifier tag different from the second identifier tag, the first identifier tag identifying the first layer as corresponding to the second layer.

24. The multi-layer optical disc of claim 23, wherein the first identifier tag is located in the middle area.

25. The multi-layer optical disc of claim 21, wherein the second layer comprises a middle area, a lead out area and a program area therebetween, wherein the second set of user data is located in the program area, and wherein the second identifier tag is located in a selected one of the lead out area or the middle area.

* * * * *